US012683402B1

(12) United States Patent
Zhao et al.

(10) Patent No.: US 12,683,402 B1
(45) Date of Patent: Jul. 14, 2026

(54) APPARATUS FOR DETECTING GRID-CONNECTED OPTIMIZATION OF DISTRIBUTED PHOTOVOLTAIC POWER STATIONS

(71) Applicants: China Railway Seventh Bureau Group Electrical Engineering Co., Ltd., Zhengzhou (CN); China Railway Seventh Bureau Group Co., Ltd., Zhengzhou (CN)

(72) Inventors: Jian Zhao, Zhengzhou (CN); Kai Tao, Zhengzhou (CN); Xiaosi Yu, Zhengzhou (CN); Youdao Wang, Zhengzhou (CN); Feng Guo, Zhengzhou (CN); Yuanping Luo, Zhengzhou (CN); Jinlong Zhang, Zhengzhou (CN); Pengju Lu, Zhengzhou (CN); Qiao Shi, Zhengzhou (CN); Yanlu Guo, Zhengzhou (CN); Xianglei Liu, Zhengzhou (CN)

(73) Assignees: China Railway Seventh Bureau Group Electrical Engineering Co., Ltd., Zhengzhou (CN); China Railway Seventh Bureau Group Co., Ltd., Zhengzhou (CN)

( * ) Notice: Subject to any disclaimer, the term of this patent is extended or adjusted under 35 U.S.C. 154(b) by 0 days.

(21) Appl. No.: 19/091,287

(22) Filed: Mar. 26, 2025

(51) Int. Cl.
| | |
|---|---|
| *H02J 3/32* | (2026.01) |
| *G08B 21/18* | (2006.01) |
| *H02G 3/08* | (2006.01) |
| *H02J 3/0014* | (2026.01) |
| *H02J 3/38* | (2026.01) |
| *H02J 101/24* | (2026.01) |

(52) U.S. Cl.
CPC .............. *H02J 3/32* (2013.01); *G08B 21/185* (2013.01); *H02G 3/08* (2013.01); *H02J 3/0014* (2026.01); *H02J 3/38* (2013.01); *H02J 2101/24* (2026.01)

(58) Field of Classification Search
CPC .... H02J 3/32; H02J 3/0014; H02J 3/38; H02J 2101/24; G08B 21/185; H02G 3/08
See application file for complete search history.

(56) References Cited

U.S. PATENT DOCUMENTS

2017/0054296 A1* 2/2017 Daniel ..................... F03D 9/25

* cited by examiner

*Primary Examiner* — Carlos Amaya
(74) *Attorney, Agent, or Firm* — Birchwood IP

(57) ABSTRACT

The present invention relates to the field of a photovoltaic power station technology, and discloses an apparatus for detecting grid-connected optimization of distributed photovoltaic power stations, including a protective box, where an outer wall of the protective box is rotatably connected to a protective plate. A system for detecting grid-connected optimization of distributed photovoltaic power stations is further provided, including: a data collection module, configured to collect parameters of all devices of the photovoltaic power station and a surrounding environment parameter in real time. A technical solution for grid-connected optimization control that integrates a particle swarm optimization algorithm with an energy storage management strategy is used, to implement optimal power matching between the photovoltaic power station and a power grid, as well as efficient scheduling of an energy storage device.

10 Claims, 5 Drawing Sheets

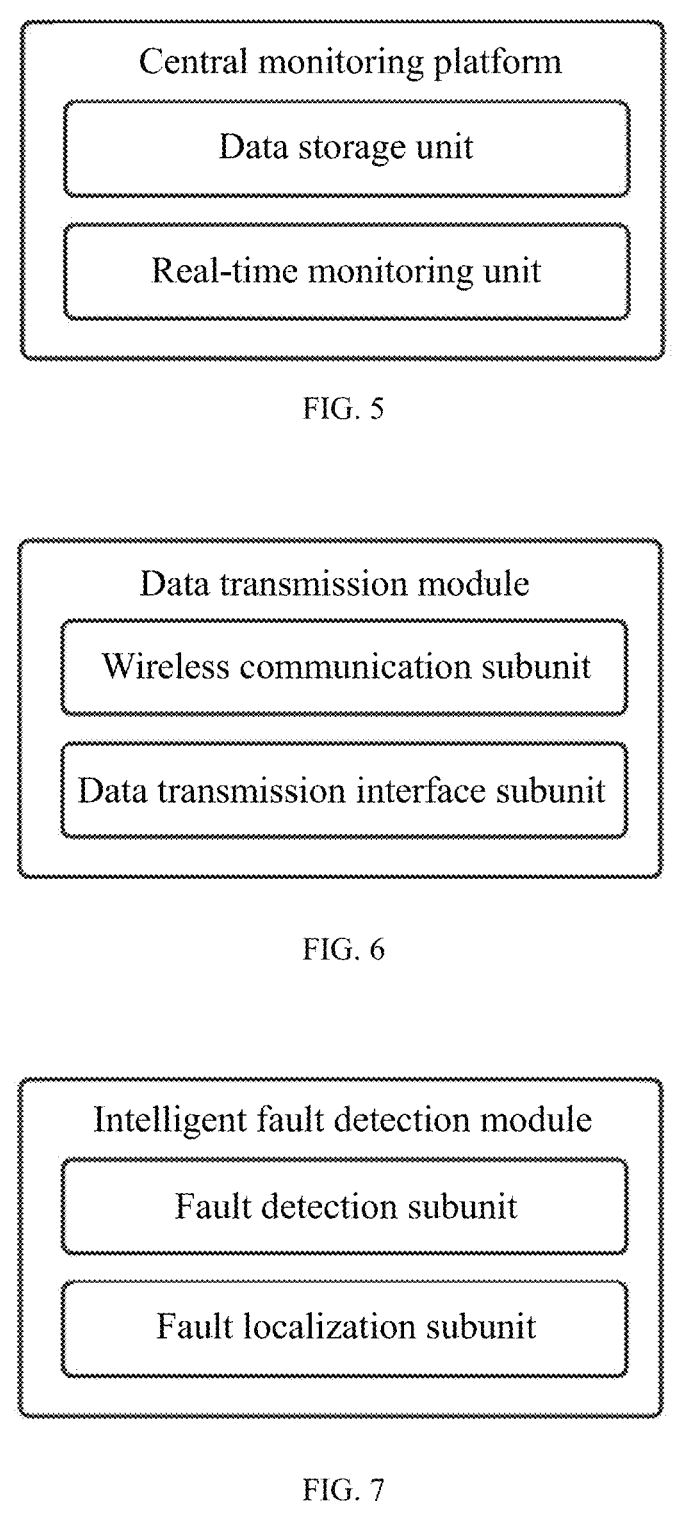

Central monitoring platform

Data storage unit

Real-time monitoring unit

FIG. 5

Data transmission module

Wireless communication subunit

Data transmission interface subunit

FIG. 6

Intelligent fault detection module

Fault detection subunit

Fault localization subunit

FIG. 7

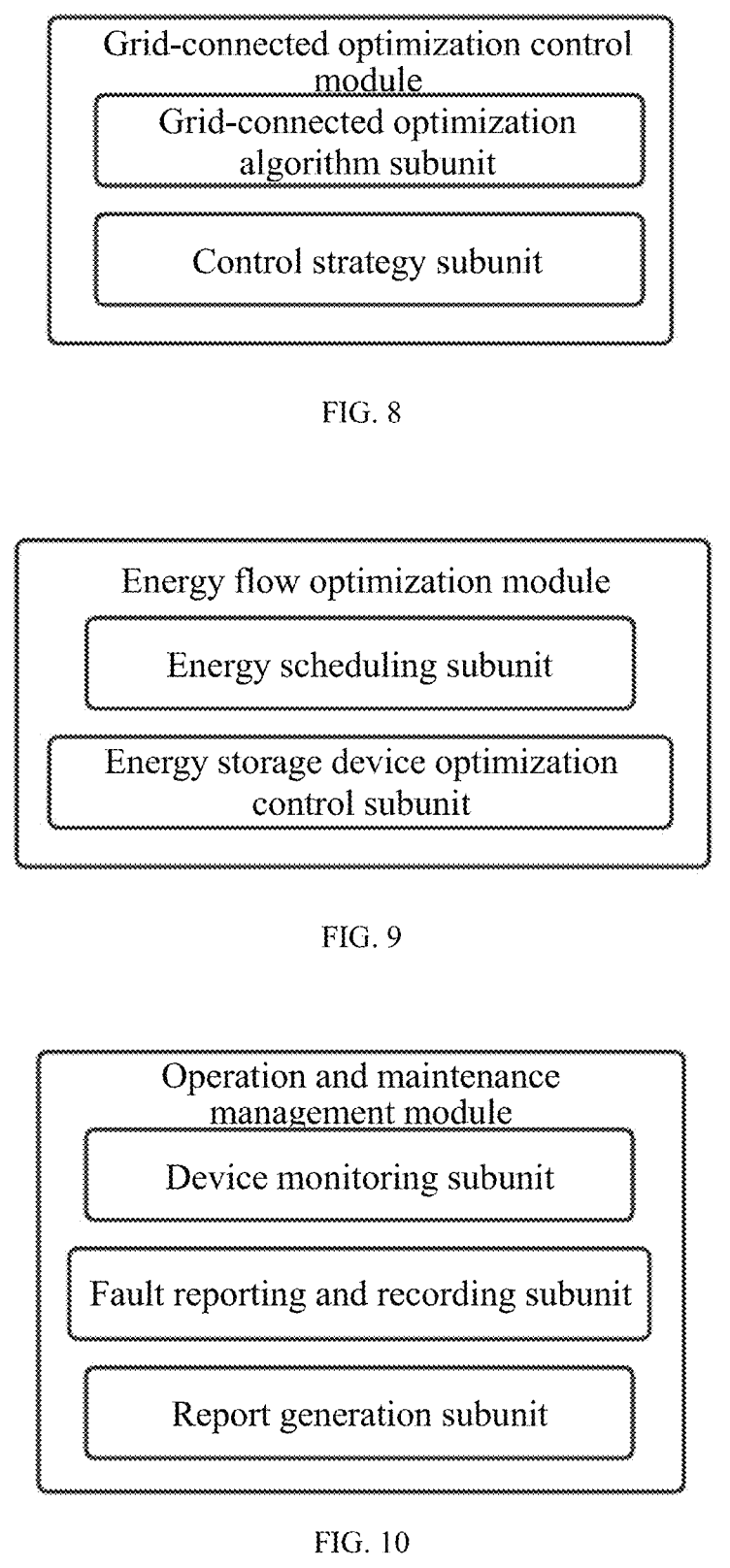

Grid-connected optimization control module

Grid-connected optimization algorithm subunit

Control strategy subunit

FIG. 8

Energy flow optimization module

Energy scheduling subunit

Energy storage device optimization control subunit

FIG. 9

Operation and maintenance management module

Device monitoring subunit

Fault reporting and recording subunit

Report generation subunit

FIG. 10

APPARATUS FOR DETECTING GRID-CONNECTED OPTIMIZATION OF DISTRIBUTED PHOTOVOLTAIC POWER STATIONS

TECHNICAL FIELD

The present invention relates to the field of the photovoltaic power station technology, and in particular to an apparatus for detecting grid-connected optimization of distributed photovoltaic power stations.

BACKGROUND

With the rapid development of renewable energy, photovoltaic power generation, as a clean energy source, has been widely applied worldwide. Photovoltaic power stations, especially distributed photovoltaic power stations, have become an important part for optimizing an energy structure. However, despite significant advantages of the photovoltaic power stations in reducing carbon emissions and improving energy self-sufficiency, the prior art still has many shortcomings in grid integration control and system optimization, which affect overall efficiency and stability of a system.

In the prior art, grid-connected control of the photovoltaic power stations typically relies on a fixed control strategy, which cannot flexibly respond to changes in a power grid load and fluctuations in photovoltaic power generation. This single control method may lead to an imbalanced power grid load or even grid instability when there are significant fluctuations in photovoltaic power generation. A control method in the prior art lacks real-time optimized scheduling for charging or discharging an energy storage device, resulting in large grid power fluctuations and poor system stability.

Detection and localization of a device fault primarily rely on a preset threshold alarm or manual inspection, resulting in low detection accuracy. When the device fault occurs, the device fault can usually be detected only when the impact of the fault is significant, and it often takes a long time to locate a source of the fault. This conventional method makes it difficult to timely find a potential problem, delaying device repair time and leading to excessive downtime for the photovoltaic power station, which affects system stability and power generation efficiency.

Scheduling of the energy storage device mostly relies on experience or a fixed charging and discharging strategy, lacking a capability of dynamic adjustment based on a real-time photovoltaic power generation output and a power grid load demand. When there is a great change in sunlight conditions, a charging/discharging process of the energy storage device is not optimized, resulting in excessive energy waste or power grid load fluctuations.

SUMMARY

To overcome shortcomings in the prior art, the present invention provides an apparatus for detecting grid-connected optimization of distributed photovoltaic power stations, which resolves problems of fluctuations in a generated power of photovoltaic power generation, mismatching between power grid loads, and lagging device fault detection during grid connection of the distributed photovoltaic power stations.

To achieve the above purpose, the present invention is implemented by using the following technical solutions: an apparatus for detecting grid-connected optimization of distributed photovoltaic power stations, including a protective box, where an outer wall of the protective box is rotatably connected to a protective plate, an outer wall of the protective plate is installed with a display, the display is in telecommunication connection with a control terminal, a lower surface of the control terminal is installed on an upper surface of the protective box, an inside of the protective box is firmly connected to a signal pole, one end of the signal pole is firmly connected to a wireless communication device, an outer wall of the wireless communication device is firmly connected to the inside of the protective box, the control terminal is in telecommunication connection with the wireless communication device, the inside of the protective box is firmly connected to an alarm light, one end of the alarm light is firmly connected to an intelligent fault detection device, the intelligent fault detection device is in telecommunication connection with the control terminal, and an outer wall of the intelligent fault detection device is firmly connected to the inside of the protective box.

A system for detecting grid-connected optimization of distributed photovoltaic power stations, including:

a data collection module, configured to collect parameters of all devices of the photovoltaic power station and a surrounding environment parameter in real time;

a central monitoring platform, configured to receive and store real-time data transmitted for data processing and analysis;

a data transmission module, configured to transmit a collected parameter to the central monitoring platform through a wireless communication protocol;

an intelligent fault detection module, configured to determine, based on collected parameter data, whether there is a fault in a device of the photovoltaic power station and generate a fault report if any;

a grid-connected optimization control module, configured to perform energy scheduling optimization based on a generated power of the photovoltaic power station, a load demand, and a state of an energy storage device;

an energy flow optimization module, configured to automatically adjust a charging and discharging strategy of the energy storage device based on a real-time load demand and a lighting condition; and an operation and maintenance management module, configured to provide real-time fault alarming, maintenance task allocation, and data archiving.

Preferably, the data collection module includes:

a photovoltaic module monitoring subunit, configured to monitor an operation parameter of a photovoltaic panel;

an environmental monitoring subunit, configured to monitor meteorological data of a surrounding environment; and an energy storage system monitoring subunit, configured to monitor data of an energy storage system.

Preferably, the central monitoring platform includes:

a data storage unit, configured to store data collected in real time and provide long-term archiving and backup of the data; and a real-time monitoring unit, configured to display and monitor a working state and environmental changes of each device in real time.

Preferably, the data transmission module includes:

a wireless communication subunit, configured to transmit data through a wireless protocol; and a data transmission interface subunit, configured to transmit sensor data from the data collection unit to the central monitoring platform.

Preferably, the intelligent fault detection module includes:

a fault detection subunit, configured to determine, based on the collected data, whether a device is beyond a preset normal working range, and trigger an alarm; and a fault localization subunit, configured to locate a fault source of the device and generate a corresponding fault repair report.

Optionally, the grid-connected optimization control module includes:

a grid-connected optimization algorithm subunit, configured to optimize scheduling based on factors such as a generated power of photovoltaic power generation, an energy storage state, and a power grid load, to reduce grid-connected fluctuations; and a control strategy subunit, configured to implement power distribution, energy storage management, and a power grid regulation strategy during grid connection.

Optionally, the energy flow optimization module includes:

an energy scheduling subunit, configured to adjust a photovoltaic power generation output based on light intensity prediction and a load demand, and optimize power supply efficiency of a power grid; and an energy storage device optimization control subunit, configured to adjust the charging and discharging strategy of the energy storage device in real time, to ensure the stability and sustainability of power supply in the power grid.

Preferably, the operation and maintenance management module includes:

a device monitoring subunit, configured to monitor working states of all devices in real time, to ensure normal operation of the devices;

a fault reporting and recording subunit, configured to record details of a fault event and track a handling process; and a report generation subunit, configured to generate reports related to system operation, a device fault, a maintenance record, and the like, for future reference and analysis.

Preferably, the grid-connected optimization algorithm subunit optimizes energy scheduling based on the generated power of the photovoltaic power station, the load demand, the state of the energy storage device, and the power grid load by using a particle swarm optimization algorithm, to maximize overall energy efficiency of the system and minimize power grid load fluctuations during grid connection.

The present invention provides an apparatus for detecting grid-connected optimization of distributed photovoltaic power stations, which has the following beneficial effects.

1. According to the present invention, a technical solution for grid-connected optimization control that integrates a particle swarm optimization algorithm with an energy storage management strategy is used, to implement optimal power matching between the photovoltaic power station and a power grid, as well as efficient scheduling of an energy storage device. Compared with a solution that relies solely on a simple control algorithm in the prior art, the present invention can automatically adjust charging and discharging of an energy storage system when a power grid load fluctuates significantly, reducing grid power fluctuations and significantly enhancing grid stability.

2. According to the present invention, the intelligent fault detection module is seamlessly integrated with the real-time data collection module, to implement rapid fault detection and precise localization of a device fault. Compared with a conventional method in which manual monitoring or fixed threshold alarming is used, machine learning and real-time data analysis are used, allowing for more accurate fault prediction and proactive prevention, thereby preventing large-scale shutdown or system loss caused by the device fault.

3. According to the present invention, an advanced energy flow optimization algorithm is used, and the charging and discharging strategy of the energy storage device is dynamically adjusted based on the real-time variations in a power generation capacity of the photovoltaic power station and a power grid load. Compared with a conventional manual adjustment or fixing strategy, the present invention can implement flexible adjustment based on real-time environmental changes and a power grid demand, enhancing energy utilization efficiency, reducing power grid load fluctuations, thereby improving overall operational efficiency of the photovoltaic power station.

4. The present invention effectively improves a fault response speed and task execution efficiency by using an intelligent task allocation and execution subunit in the operation and maintenance management module. Compared with a solution with more manual intervention and low task scheduling efficiency in the prior art, the automated and intelligent task allocation and execution process in the present invention ensures that a device fault can be quickly handled, greatly reducing system downtime, and improving system operation and maintenance efficiency, and device availability.

BRIEF DESCRIPTION OF DRAWINGS

FIG. 5 is a schematic diagram of a central monitoring platform of the present invention;

FIG. 6 is a schematic diagram of a data transmission module of the present invention;

FIG. 7 is a schematic diagram of an intelligent fault detection module of the present invention;

FIG. 8 is a schematic diagram of a grid-connected optimization control module of the present invention;

FIG. 9 is a schematic diagram of an energy flow optimization module of the present invention; and FIG. 10 is a schematic diagram of an operation and maintenance management module of the present invention.

1. protective plate; 2. signal pole; 3. display; 4. alarm light; 5. protective box; 6. control terminal; 7. wireless communication device; 8. intelligent fault detection device.

DESCRIPTION OF EMBODIMENTS

Technical solutions in embodiments of the present invention are clearly and completely described below with reference to accompanying drawings in the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
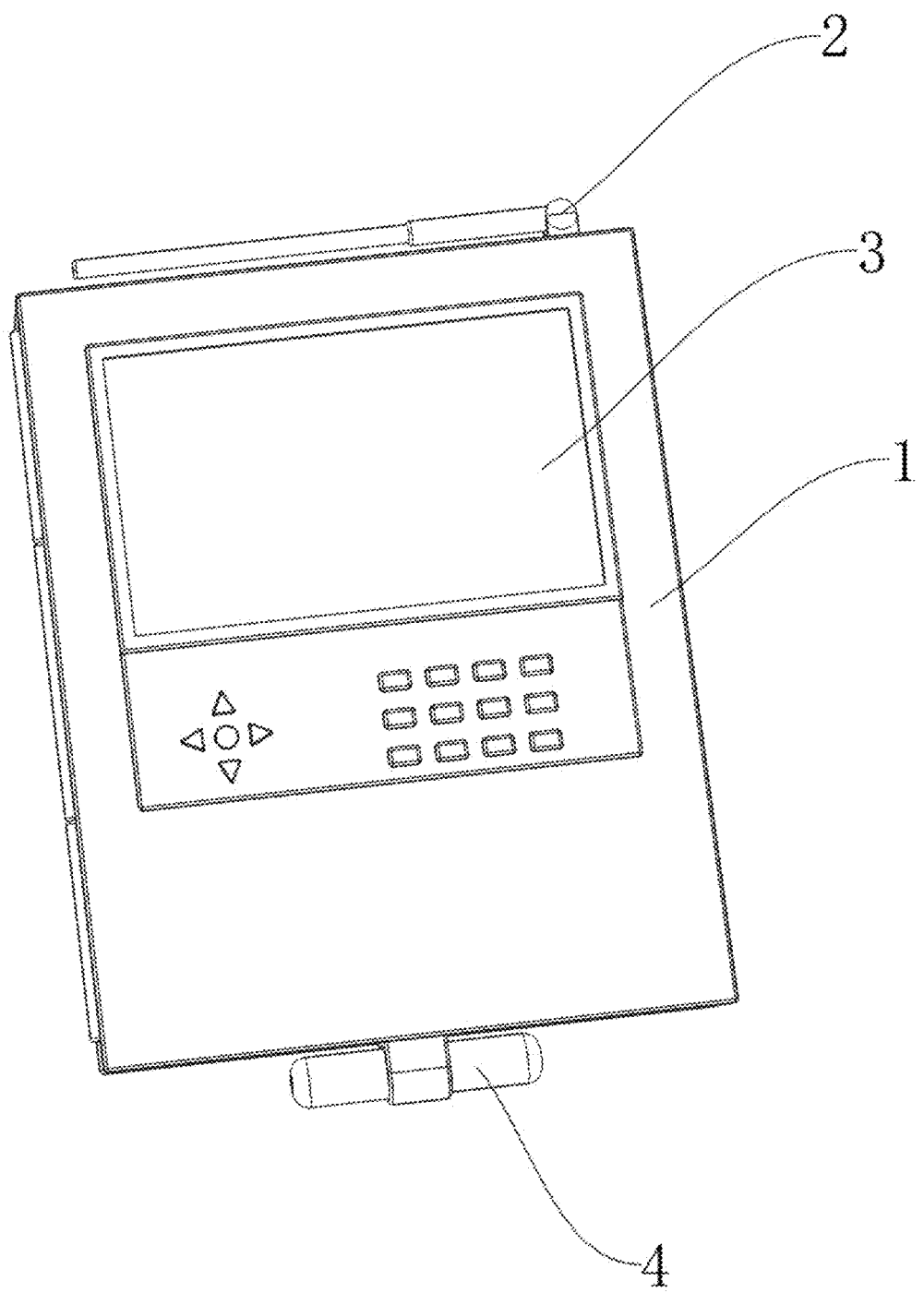
FIG. 1 is a three-dimensional diagram of the present invention.
Figure 2:
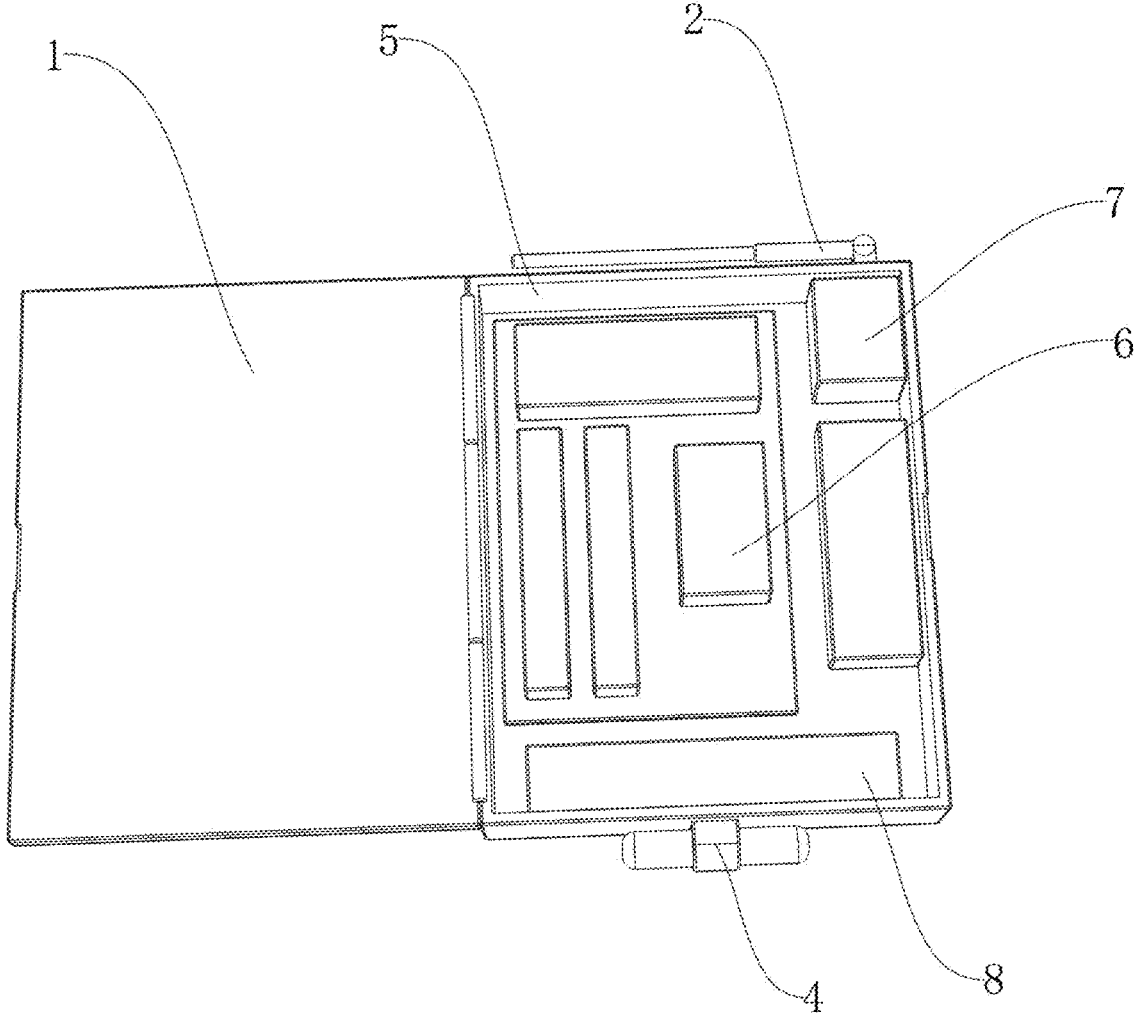
FIG. 2 is a schematic inner structural diagram of the present invention.
Figure 3:
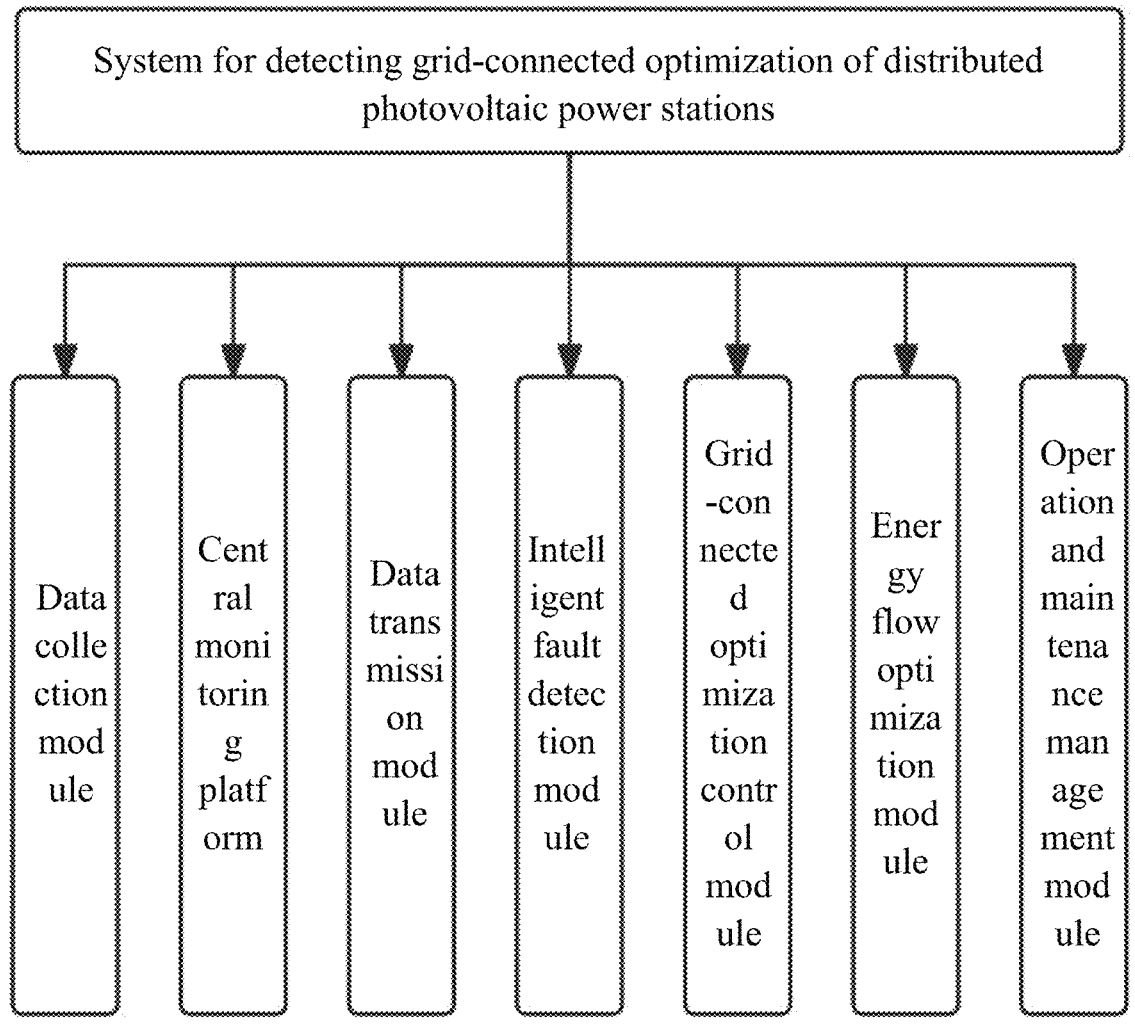
FIG. 3 is a system block diagram of the present invention.
Figure 4:
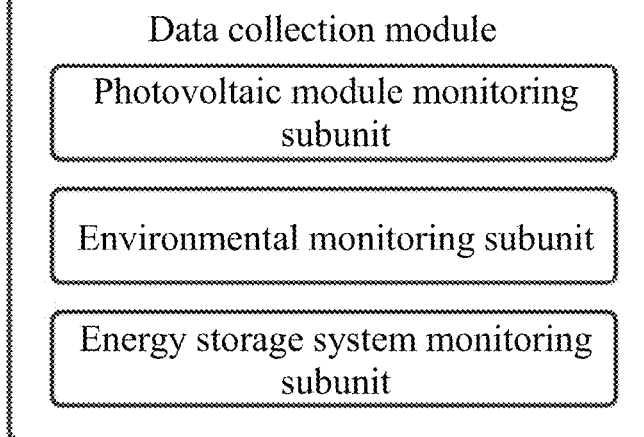
FIG. 4 is a schematic diagram of a data collection module of the present invention.

Refer to FIG. 1 and FIG. 2. Embodiments of the present invention provide an apparatus for detecting grid-connected optimization of distributed photovoltaic power stations, including a protective box 5, where an outer wall of the protective box 5 is rotatably connected to a protective plate 1, an outer wall of the protective plate 1 is installed with a display 3, the display 3 is in telecommunication connection with a control terminal 6, a lower surface of the control terminal 6 is installed on an upper surface of the protective box 5, an inside of the protective box 5 is firmly connected to a signal pole 2, one end of the signal pole 2 is firmly connected to a wireless communication device 7, an outer wall of the wireless communication device 7 is firmly connected to the inside of the protective box 5, the control terminal 6 is in telecommunication connection with the wireless communication device 7, the inside of the protective box 5 is firmly connected to an alarm light 4, one end of the alarm light 4 is firmly connected to an intelligent fault detection device 8, the intelligent fault detection device 8 is in telecommunication connection with the control terminal 6, and an outer wall of the intelligent fault detection device 8 is firmly connected to the inside of the protective box 5.

Specifically, the protective box 5 is installed on a wall, an internal device is protected through the protective plate 1 and the protective box 5, a collected parameter is gathered and transmitted to a load monitoring device 6 through the signal pole 2 and the wireless communication device 7, the collected parameter is displayed through the display 3, the parameter is adjusted through a button on the display 3, an adjusted collected parameter is monitored through the intelligent fault detection device 8, and an alarm is sent through the alarm light 4 in case of an abnormality to prompt operation and maintenance personnel.

Refer to FIG. 3 to FIG. 10. A system for detecting grid-connected optimization of distributed photovoltaic power stations includes the following.

A data collection module, configured to collect parameters of all devices of the photovoltaic power station and a surrounding environment parameter in real time.

Specifically, the data collection module in this embodiment collects a task of key parameters of all devices of the photovoltaic power station and surrounding environment parameter data in real time. The module obtains operation data of a photovoltaic module, an energy storage system, and an environment by using an accurate sensor device, to provide basic data support for subsequent modules of the system.

In this embodiment, a photovoltaic module monitoring subunit monitors key working parameters of a photovoltaic panel through a voltage sensor, a current sensor, a temperature sensor, and a light intensity sensor, and these parameters directly influence power output of the photovoltaic module and reflect a health state of the module, and common photovoltaic panel monitoring parameters include:

voltage ($V_{PV}$); a voltage of the photovoltaic panel;
current ($I_{PV}$); a current of the photovoltaic panel;
temperature ($T_{PV}$); a working temperature of the photovoltaic panel; and
light intensity ($G_{PV}$); a radiation intensity per unit area measured by the light intensity sensor.

The data helps the system know a working state of the photovoltaic panel, whether there are problems such as overloading and overheating, to ensure a normal electricity generation capacity. A generated power $P_{PV}$ of the photovoltaic panel can be calculated by the following formula, $$P_{PV} = V_{PV} \times I_{PV}$$

where $V_{PV}$ is a voltage of the photovoltaic panel, $I_{PV}$ is a current of the photovoltaic panel, the efficiency of photovoltaic power generation is usually influenced by the temperature and the light intensity. Therefore, monitoring these parameters can help the system evaluate power generation efficiency of the photovoltaic panel.

Monitoring of the light intensity $G_{PV}$ directly influences the evaluation of a photovoltaic power generation output. The light intensity can be obtained by measuring solar radiation. On sunny days, the system can predict a great power generation capacity based on a high light intensity and adjust a charging strategy of the energy storage device, to store excess electricity for future use.

In this embodiment, an environmental monitoring subunit is mainly configured to collect meteorological data around the photovoltaic power station, including parameters such as a temperature, a humidity, a wind speed, and the light intensity. Environmental monitoring data is very important for implementing accurate evaluation of the photovoltaic power generation.

The ambient temperature ($T_{env}$) is used to reflect a temperature of an external environment;

the ambient humidity ($H_{env}$) monitors a humidity of the environment, which can help determine whether there are water droplets condensing on a surface of the photovoltaic panel, which affects power generation efficiency;

monitoring of the wind speed ($W_{env}$) can help predict the impact of weather changes in a photovoltaic system, and especially during a high temperature period, the wind speed may help cool down the photovoltaic module; and monitoring of the light intensity ($G_{env}$) is particularly important, which reflects a radiation intensity of light and has a direct impact on a power generation potential of the photovoltaic power station. Under a high light intensity condition, the power generation capacity of the photovoltaic panel is strong, and the ambient temperature ($T_{env}$) directly influences the working efficiency of the photovoltaic panel. An increase in the ambient temperature reduces the power generation efficiency of the photovoltaic module.

In this embodiment, an energy storage system monitoring subunit monitors a state of the energy storage device by using a battery management system (BMS), to ensure that the energy storage device maintains normal working during charging or discharging. Monitored key parameters include:

energy storage voltage ($V_{storage}$); used to monitor a battery voltage of the energy storage system;

energy storage current ($I_{storage}$), used to monitor a charging current or discharging current of a battery;

energy storage temperature ($T_{storage}$), used to monitor a temperature of the battery, to prevent overheating; and power output ($P_{storage}$), power output of the energy storage device, which can be obtained by calculating a current and a voltage.

The monitoring of the energy storage system ensures that the battery maintains an optimal working state during charging and discharging. A formula for calculating the charging power $P_{storage}$ of the energy storage battery is as follows:

$$P_{storage} = V_{storage} \times I_{storage}$$

$V_{storage}$ is the voltage of the energy storage device, $I_{storage}$ is the current of the energy storage device, and monitoring a state of the energy storage device ensures that the system can release stored energy timely when a load demand is great.

The data collection module in this embodiment implements real-time monitoring and data transmission of key devices and the surrounding environment in the photovoltaic power station by using high-precision sensors and a wireless communication technology.

A central monitoring platform, configured to receive and store real-time data transmitted for data processing and analysis.

Specifically, in this embodiment, the central monitoring platform includes two main functional units: a data storage unit and a real-time monitoring unit. The data storage unit is responsible for long-term storage and backup of all collected data to ensure data integrity and traceability. The real-time monitoring unit is responsible for displaying an operation state of the system in real time, facilitating viewing and operation by maintenance personnel.

In this embodiment, the data storage unit is responsible for persistent storage of data transmitted from the data collection module, including parameters of the voltage, current, and temperature of the photovoltaic panel, as well as the light intensity, temperature, and humidity collected by an environmental monitoring sensor.

A redundant backup strategy is usually used for a database. Through regular backups, the system can ensure that historical data can still be recovered even in the event of data loss or a device fault.

A main function of the real-time monitoring unit in this embodiment is to display changes in all key parameters in real time. Through a graphical user interface, operation and maintenance personnel can view a power generation state, environmental data, and charging and discharging states of the energy storage device of the photovoltaic panel at any time. If a piece of data exceeds a preset normal range, the system triggers an alarm to remind the operation and maintenance personnel to check the device timely.

Specifically, the real-time monitoring unit presents real-time data such as the voltage ($V_{PV}$), current ($I_{PV}$), and temperature ($T_{PV}$) of the photovoltaic panel to the operation and maintenance personnel. The voltage and current data reflect a power generation capacity of the photovoltaic panel in real time. If the current and voltage do not match, it indicates that there is a fault in the photovoltaic panel. The system automatically triggers an alarm and prompts a fault location based on a data change.

In addition, environmental monitoring data such as the light intensity ($G_{env}$) and the temperature ($T_{env}$) are updated in real time, to help the operation and maintenance personnel quickly determine the impact of an external environment on power generation in the power station.

A data transmission module, configured to transmit a collected parameter to the central monitoring platform through a wireless communication protocol.

Specifically, the real-time data collected by the data collection module in this embodiment is transmitted to the central monitoring platform through the data transmission module for subsequent data processing and analysis. The stability, real-time performance, and safety of the data transmission module directly influence the overall performance of the system, especially in a real-time monitoring system such as the photovoltaic power station. Timely data transmission is crucial for fault detection, grid-connected optimization, and energy flow scheduling.

A role of a wireless communication subunit is to ensure smooth and efficient data transmission between each data collection unit and the central monitoring platform, and a low-power wide area network technology is used for data transmission.

Selection of the Data Transmission Protocol

All data collected by the data collection module through a sensor unit, including the voltage ($V_{PV}$), current ($I_{PV}$), temperature ($T_{PV}$), and the light intensity ($G_{PV}$) of the photovoltaic panel, is transmitted to the central monitoring platform through the data transmission protocol. The data is related to real-time performance and an environmental state of the photovoltaic module, and provides data support for decision-making such as fault detection and energy efficiency optimization of the photovoltaic power station.

Specifically, the data transmission module formats the data and transmits formatted data in the form of packets through an appropriate communication protocol. The transmitted data packets may contain the following information:

$$D_{packet} = \{V_{PV}, I_{PV}, T_{PV}, G_{PV}, T_{env}, H_{env}, W_{env}\}$$

where $V_{PV}$ represents voltage data, $I_{PV}$ represents current data, $T_{PV}$ represents V temperature data, $G_{PV}$ represents the light intensity, $T_{env}$ represents the environmental temperature, $H_{env}$ represents the environmental humidity, and $W_{env}$ represents wind speed data.

A data transmission interface unit is responsible for data encapsulation, verification, encryption, and the like, to ensure the accuracy and safety of the data. During data transmission, to prevent data loss, the system can use an automatic retransmission mechanism to ensure that the data successfully reaches the central monitoring platform.

In this embodiment, efficient transmission of data from various sub modules to the central monitoring platform is ensured, and data safety and real-time performance are also ensured through technologies such as data encryption and compression. Through the application of the wireless communication protocol, the data transmission module effectively supports various operations and optimized decisions of the photovoltaic power station, enabling the system to operate stably in a large-scale distributed environment and improving the efficiency and reliability of the photovoltaic power station.

An intelligent fault detection module, configured to determine, based on collected parameter data, whether there is a fault in a device of the photovoltaic power station and generate a fault report if any.

Specifically, in this embodiment, a main function of the intelligent fault detection module is to analyze various real-time collected data, diagnose a device fault in real time based on a preset threshold and an intelligent algorithm, and generate a detailed fault report. The intelligent fault detection module mainly includes two parts: a fault detection subunit and a fault localization subunit. Specifically, the fault detection subunit is configured to monitor whether a device parameter exceeds a normal operation range, and the fault localization subunit further determines a location of a fault by analyzing data correlation.

The fault detection subunit is responsible for obtaining real-time operation parameters from the photovoltaic panel, the energy storage system, an inverter, and other devices, and comparing the parameters with a normal operation range of the device, to determine whether there is a fault in the device.

Real-time monitoring of the voltage, current, and temperature: data including a voltage ($V_{device}$), a current ($I_{device}$), and a temperature ($T_{device}$) of the photovoltaic panel, a battery pack, and the inverter are obtained through sensors. If the current, voltage, or temperature of the device exceeds a preset range, the system immediately triggers an alarm. The voltage $V_{PV}$ and current $I_{PV}$ of the photovoltaic panel should be within a specific range during normal operation. If the current or voltage is abnormal, the system finds a fault timely through a preset fault determining formula.

Fault Determining Formula:

$$\text{Fault} = \begin{cases} 1 & \text{if } |V_{device} - V_{threshold}| > \epsilon \text{ or } |I_{device} - I_{threshold}| > \epsilon \\ 0 & \text{otherwise} \end{cases}$$

where $V_{threshold}$ and $I_{threshold}$ are threshold values of normal operation ranges of the voltage and current, and $\epsilon$ is an allowable error.

The impact of an environmental temperature: a temperature sensor ($T_{env}$) monitors temperature changes in the environment. Because the environmental temperature influences an output power of the photovoltaic panel, temperature fluctuations directly influence the performance of the system. Specifically, if the temperature is extremely high, the efficiency of the photovoltaic panel is decreased.

The influence of the light intensity on the photovoltaic panel: the light intensity ($G_{env}$) is an important factor of the power generation efficiency of the photovoltaic panel. When the light intensity is lower than a preset standard, the system determines that the output power of the photovoltaic panel is insufficient, which may result in efficiency loss or a fault.

The fault localization subunit is intended to further analyze a fault source and locate a specific fault location. The subunit performs comprehensive analysis on collected data, to determine whether a fault occurs in the photovoltaic panel, the energy storage device, the inverter, or another device.

When the system detects an abnormal voltage, an abnormal current, or an abnormal temperature of a photovoltaic panel, a fault localization module analyzes parameter data of the photovoltaic panel and an adjacent photovoltaic panel or other parts of the system, to determine whether the fault is a single device fault or a system level fault. If the current of the photovoltaic panel is extremely low, the system compares the voltage and temperature data of the photovoltaic panel and performs analysis combined with data of a surrounding photovoltaic panel. If a performance difference between the device and other devices is significant, the fault may be a fault in the photovoltaic panel.

The fault localization subunit uses a machine learning algorithm to train and predict fault data, and the algorithm can recognize a common pattern of a device fault, diagnose a current fault, and predict a potential device fault by learning from historical fault data, thereby performing intervention in advance.

The fault is located, and the system generates a detailed fault report. The report includes a fault type, a location, a scope of impact, a remediation recommendation, and the like, the report is displayed to the operation and maintenance personnel through the central monitoring platform, and a remediation suggestion is provided.

The intelligent fault detection module can efficiently detect, locate, and predict a device of the photovoltaic power station by combining threshold determining, data correlation analysis, machine learning, a predicting model, and other technologies.

A grid-connected optimization control module, configured to perform energy scheduling optimization based on a generated power of the photovoltaic power station, a load demand, and a state of an energy storage device.

Specifically, in this embodiment, the grid-connected optimization control module uses a particle swarm optimization (PSO) algorithm to optimize various decisions during grid connection, and is combined with an energy storage management strategy, to ensure the optimal matching between the photovoltaic power station and a power grid. The grid-connected optimization control module works closely with the data collection module, the intelligent fault detection module, and the energy flow optimization module, to implement balance and optimization of a power grid load by adjusting a power generation strategy of the photovoltaic power station and a charging/discharging state of the energy storage device in real time.

An optimal charging and discharging strategy of the energy storage device, and a balance in a generated power output and a load of the photovoltaic power station are obtained through calculation, so that the fluctuations of a grid-connected power are minimized, and system optimization is implemented.

The particle swarm optimization algorithm simulates motion of a swarm of particles to find an optimal solution. Each particle represents a possible solution, and the optimal solution meeting an optimization objective is finally found by constantly updating a velocity and position of each particle.

Specifically, the particle swarm optimization algorithm is used to adjust the generated power of the photovoltaic power station and the charging and discharging power of the energy storage device. An objective function of the system is to minimize a difference between the grid-connected power and the power grid load. The optimization objective is to minimize grid fluctuations and energy storage device loss. An objective function is as follows:

$$J = \int_0^T (P_{grid}(t) - P_{load}(t))^2 d$$

where $P_{grid}(t)$ represents a grid-connected power, represents the power $P_{load}(t)$ grid load, an objective is to minimize the difference between the power grid load and the grid-connected power, and T is a time interval for optimizing control.

The particle swarm optimization algorithm updates a particle position (solution) and velocity through the following formula:

$$V_i^{k+1} = wV_i^k = c_1 r_1 \left(P_{best} - X_i^k\right) + c_2 r_2 \left(G_{best} - X_i^k\right)$$

$$X_i^{k+1} = X_i^k + V_i^{k+1}$$

where $$V_i^k$$

is a velocity of the particle, $$X_i^k$$

is a position of the particle, $P_{best}$ is a local optimal solution of the particle, $G_{best}$ is a global optimal solution, $r_1$ and $r_2$ are random numbers, and W is inertia weight used to control a change in the velocity of the particle.

The particle swarm optimization algorithm can dynamically adjust the charging and discharging strategy of the energy storage device and the electricity power output of the photovoltaic power station based on a real-time power grid load demand, a battery energy storage state, and an output of the generated power of the photovoltaic power generation.

A role of the energy storage management strategy in the grid-connected optimization control module is to precisely regulate charging and discharging of the energy storage device, to ensure power grid load balance and maximize a power generation capacity of the photovoltaic power station. When there is excessive amount of photovoltaic power generation, the energy storage device absorbs the excess electricity. When the amount of photovoltaic power generation is insufficient, the energy storage device releases stored electrical energy to maintain the stability of the power grid.

When the load on the power grid increases significantly, the system automatically increases a discharging power of the energy storage device, to timely replenish electricity needed by the power grid. When the power grid load is low, the system increases the charging power of the energy storage device, to ensure that the device can provide sufficient power support when needed.

Charging mode: when a generated power of photovoltaic power generation exceeds the power grid load, the energy storage device automatically charges, and the charging power $$P_{storage}^{charge}$$

is adjusted based on charging efficiency of the energy storage device and a demand of the power grid load, $$P_{storage}^{charge} = \min(P_{PV}, P_{grid} - P_{load})$$

where $P_{PV}$ is a generated power of the photovoltaic power station, $P_{load}$ is the power grid load, $P_{grid}$ is a power demand of the power grid. The system distributes the difference between the generated power of photovoltaic power generation and the power grid load to the energy storage device, to prevent excessive energy waste.

Discharging mode: when the power grid load exceeds a power generation capacity of the photovoltaic power station, the energy storage device starts discharging, and a discharging power $$P_{storage}^{discharge}$$

is adjusted based on the demand of the power grid load, $$P_{storage}^{discharge} = \min(P_{load} - P_{PV}, P_{storage}^{max})$$

where $$P_{storage}^{max}$$

is a maximum discharging power of the energy storage device, to ensure stable power support for the power grid when the load is high.

An objective of grid-connected scheduling is to dynamically adjust the generated power of the photovoltaic power station and the charging and discharging strategy of the energy storage device, to maximize grid stability and minimize fluctuations. This objective can be achieved in combination with the particle swarm optimization algorithm and energy storage management strategy. Through real-time data interaction with the data collection module, the system can continuously monitor the power grid load, the photovoltaic power generation output, and the state of the energy storage device, and adjust a strategy to adapt to constantly changing grid demands.

The grid-connected optimization control module in this embodiment can efficiently and intelligently adjust the generated power of the photovoltaic power station and the charging and discharging strategy of the energy storage device in combination with the particle swarm optimization algorithm and the energy storage management strategy. the system can achieve optimal matching between the power grid load and the generated power of the photovoltaic power station by closely collaborating with the data collection module, the intelligent fault detection module, and the energy flow optimization module, improving grid stability, reducing energy waste, and maximizing power generation efficiency of the photovoltaic power station.

An energy flow optimization module, configured to automatically adjust a charging and discharging strategy of the energy storage device based on a real-time load demand and a lighting condition.

Specifically, in this embodiment, a working principle of the energy flow optimization module is closely related to other modules. The energy flow optimization module adjusts, by obtaining the power grid load, the photovoltaic power generation output, the state of the energy storage device state, and environmental data in real time, a working mode of the energy storage device based on an optimization algorithm, ensuring that the operation of the photovoltaic power station is more efficient and stable and is optimally matched with the power grid load.

Objective of Energy Flow Optimization

The objective of the energy flow optimization module is to:

maximize energy storage efficiency: charging and discharging of the energy storage device are accurately scheduled, to minimize loss during energy storage, ensuring that excess electricity generated by the photovoltaic power station can be effectively stored and released timely when needed;

improve power grid stability: the charging and discharging strategy of the energy storage device is optimized, to reduce fluctuations of the power grid load, and the energy storage device dynamically adjusts a charging and discharging power based on a load demand of the power grid, ensuring the stability of power supply; and optimize a utilization rate of photovoltaic power generation: the photovoltaic power generation output and operation of the energy storage device are dynamically adjusted, to ensure that the photovoltaic power station maximizes a power generation capacity while preventing excessive energy waste.

The energy storage device is a key part of the energy flow optimization module. Power generation of the photovoltaic power station has fluctuations and intermittency, and the energy storage system is configured to balance a difference between the power grid load and the photovoltaic power generation. The charging and discharging strategy of the energy storage device needs to be dynamically adjusted based on the load demand of the power grid and a power generation condition of the photovoltaic power station.

Charging Strategy:

When the photovoltaic power station generates excess electricity and the power grid load is low, the energy storage device starts charging. A charging power of the energy storage device is calculated through the following formula:

$$P_{storage}^{charge} = \min\left(P_{PV}(t) - P_{load}(t), P_{storage}^{max}\right)$$

where $$P_{storage}^{charge}$$

is a charging power of the energy storage device, $P_{PV}(t)$ is a generated power of the photovoltaic power station, $P_{load}(t)$ is a power grid load, and $$P_{storage}^{max}$$

is a maximum charging power of the energy storage device. This formula ensures that the energy storage device is charged and stores excess electricity when the generated power of the photovoltaic power station exceeds the power grid load.

Discharging Strategy:

When power generation of the photovoltaic power station is not enough to meet the power grid load, the energy storage device starts discharging. A discharging power of the energy storage device is calculated through the following formula:

$$P_{storage}^{discharge} = \min\left(P_{load}(t) - P_{PV}(t), P_{storage}^{max}\right)$$

where $$P_{storage}^{discharge}$$

is the discharging power of the energy storage device $P_{load}(t)$, is a power grid load, $P_{PV}(t)$ is the generated power of the photovoltaic power station, and $$P_{storage}^{max}$$

is a maximum discharging power of the energy storage device. This formula ensures that the energy storage device releases stored electricity when the photovoltaic power station is running low on electrical energy, to replenish the power grid load.

When a photovoltaic power generation output is high, the system increases a charging power of the energy storage device, to ensure that excess electrical energy is stored efficiently. When a photovoltaic power generation output is low and the load is high, the system starts the energy storage device for discharging, to prevent overloading of the power grid.

Specifically, a charging and discharging strategy of the energy storage device takes into account not only a current power grid load, but also a future power grid load and a photovoltaic power generation output.

Objective Function of Energy Flow Optimization:

A core objective of the energy flow optimization is to minimize energy waste of the photovoltaic power station and ensure matching between the power grid load and the photovoltaic power generation output. An expression of the objective function is as follows:

$$J = \int_0^T \left(P_{storage}^{charge}(t) + P_{storage}^{discharge}(t)\right)dt$$

where J is an optimization objective, $$P_{storage}^{charge}(t) \text{ and } P_{storage}^{discharge}(t)$$

are a charging power and a discharging power of the energy storage device respectively, t is time, and an objective is to minimize power fluctuation in an energy storage process and ensure that a load demand of the power grid is met timely.

The energy flow optimization module in this embodiment dynamically adjusts the charging and discharging strategy of the energy storage device by combining real-time data and an optimization algorithm, to ensure optimal matching between a power generation capacity of the photovoltaic power station and the power grid load. The power grid load, the photovoltaic power generation output and an operation state of the energy storage device are monitored in time, and the system can implement optimal scheduling of the power grid, to minimize energy waste and improve the stability of the power grid.

An operation and maintenance management module, configured to provide real-time fault alarming, maintenance task allocation, and data archiving.

Specifically, in this embodiment, the operation and maintenance management module works closely with other modules such as the data collection module, the intelligent fault detection module, and the grid-connected optimization control module, to implement comprehensive management of the device through functions such as real-time monitoring and automatic task allocation. Through these functions, the system can obtain a device state, an operation condition, and environmental data of the photovoltaic power station in real time, and perform fault warning, task scheduling, report generation, and other operations, to ensure that the photovoltaic power station can obtain a rapid response when a fault occurs and minimize the impact of a fault.

A device monitoring subunit is responsible for real-time monitoring of operation states of all key devices in the photovoltaic power station. The device monitoring subunit can obtain, after integrated with the data collection module, voltage, current, and temperature data of the photovoltaic panel in real time, as well as state information of the energy storage device, the inverter, and other devices. Based on such real-time data, the system evaluates the operation state of the device and feeds the data back to the operation and maintenance management module.

Specifically, the device monitoring subunit determines whether the device is in a normal working state by monitoring parameters of the voltage $V_{PV}$, current $I_{PV}$, and temperature $T_{PV}$ of the photovoltaic panel in real time. If a voltage, current, or temperature of a device exceeds a set normal working range, the system triggers a fault alarm.

When the current or voltage of the device deviates from a preset value, the system calculates whether a fault has occurred based on the preset threshold. If a calculated power result is significantly lower than a normal value, the system considers that there is a fault in the device and feeds back the fault information to the central monitoring platform.

A fault reporting and recording subunit is responsible for recording and archiving fault information of the device. In case of a device fault, the system generates a detailed fault report, which includes key information such as a fault type, fault time, an affected device, fault cause analysis, and maintenance measures. These reports help an operator quickly find a root cause of a problem and take effective remediation actions.

General contents of the fault report include:

fault time: a specific time point at which the device fault occurs, helping the operation and maintenance personnel accurately understand a time point for the fault;

fault type: a type of the fault, determined based on a type of a detected abnormality;

affected device: a type of the device in which the fault occurs is indicated in the report;

fault description: a fault phenomenon described specifically;

fault cause analysis: a possible fault cause provided through the analysis of the intelligent fault detection module; and repair measures: a recommended repair solution is provided.

A report generation subunit is responsible for merging monitoring and fault logging data to generate periodic or ad-hoc device operation reports. These reports include not only a health state of the device, but also performance indicators of system operation. The periodic reports can be used to assess a long-term operation state of the device and prevent a potential fault.

A task allocation and execution subunit is a key function of the operation and management module, and is mainly configured to dynamically allocate a task based on a fault type, severity, a skill level of the operation and maintenance personnel, and a current workload, and automatic allocation of the task can improve response efficiency and ensure that the fault is handled timely.

The operation and maintenance management module in this embodiment implements comprehensive management of the device of the photovoltaic power station through device monitoring, fault reporting and recording, and task allocation and execution, can monitor an operation state of the device in real time, handle a fault timely, and can prevent the occurrence of a potential problem through fault prevention and prediction.

Although embodiments of the present invention have been shown and described, it can be understood that a person of ordinary skill in the art can perform various variations, modifications, substitutions, and variants on these embodiments without departing from the principle and spirit of the present invention, and the scope of the present invention is limited by attached claims and equivalents thereof.

What is claimed is:

1. An apparatus for detecting grid-connected optimization of distributed photovoltaic power stations, comprising a protective box (5), wherein an outer wall of the protective box (5) is rotatably connected to a protective plate (1), and an outer wall of the protective plate (1) is installed with a display (3), the display (3) is in telecommunication connection with a control terminal (6), a lower surface of the control terminal (6) is installed on an upper surface of the protective box (5), an inside of the protective box (5) is firmly connected to a signal pole (2), one end of the signal pole (2) is firmly connected to a wireless communication device (7), an outer wall of the wireless communication device (7) is firmly connected to the inside of the protective box (5), the control terminal (6) is in telecommunication connection with the wireless communication device (7), the inside of the protective box (5) is firmly connected to an alarm light (4), one end of the alarm light (4) is firmly connected to an intelligent fault detection device (8), the intelligent fault detection device (8) is in telecommunication connection with the control terminal (6), and an outer wall of the intelligent fault detection device (8) is firmly connected to the inside of the protective box (5).

2. A system for detecting grid-connected optimization of distributed photovoltaic power stations, which is based on the apparatus for detecting grid-connected optimization of distributed photovoltaic power stations according to claim 1, wherein the system comprises:

a data collection module, configured to collect parameters of all devices of the photovoltaic power station and a surrounding environment parameter in real time;

a central monitoring platform, configured to receive and store real-time data transmitted for data processing and analysis;

a data transmission module, configured to transmit a collected parameter to the central monitoring platform through a wireless communication protocol;

an intelligent fault detection module, configured to determine, based on collected parameter data, whether there is a fault in a device of the photovoltaic power station and generate a fault report if any;

a grid-connected optimization control module, configured to perform energy scheduling optimization based on a generated power of the photovoltaic power station, a load demand, and a state of an energy storage device;

an energy flow optimization module, configured to automatically adjust a charging and discharging strategy of the energy storage device based on a real-time load demand and a lighting condition; and an operation and maintenance management module, configured to provide real-time fault alarming, maintenance task allocation, and data archiving.

3. The system for detecting grid-connected optimization of distributed photovoltaic power stations according to claim 2, wherein the data collection module comprises:

a photovoltaic module monitoring subunit, configured to monitor an operation parameter of a photovoltaic panel;

an environmental monitoring subunit, configured to monitor meteorological data of a surrounding environment; and an energy storage system monitoring subunit, configured to monitor data of an energy storage system.

4. The system for detecting grid-connected optimization of distributed photovoltaic power stations according to claim 2, wherein the central monitoring platform comprises:

a data storage unit, configured to store data collected in real time and provide long-term archiving and backup of the data; and a real-time monitoring unit, configured to display and monitor a working state and environmental changes of each device in real time.

5. The system for detecting grid-connected optimization of distributed photovoltaic power stations according to claim 2, wherein the data transmission module comprises:

a wireless communication subunit, configured to transmit data through a wireless protocol; and a data transmission interface subunit, configured to transmit sensor data from the data collection unit to the central monitoring platform.

6. The system for detecting grid-connected optimization of distributed photovoltaic power stations according to claim 2, wherein the intelligent fault detection module comprises:

a fault detection subunit, configured to determine, based on the collected data, whether a device is beyond a preset normal working range, and trigger an alarm; and a fault localization subunit, configured to locate a fault source of the device and generate a corresponding fault repair report.

7. The system for detecting grid-connected optimization of distributed photovoltaic power stations according to claim 2, wherein the grid-connected optimization control module comprises:

a grid-connected optimization algorithm subunit, configured to optimize scheduling based on factors such as a generated power of photovoltaic power generation, an energy storage state, and a power grid load, to reduce grid-connected fluctuations; and a control strategy subunit, configured to implement power distribution, energy storage management, and a power grid regulation strategy during grid connection.

8. The system for detecting grid-connected optimization of distributed photovoltaic power stations according to claim 2, wherein the energy flow optimization module comprises:

an energy scheduling subunit, configured to adjust a photovoltaic power generation output based on light intensity prediction and a load demand, and optimize power supply efficiency of a power grid; and an energy storage device optimization control subunit, configured to adjust the charging and discharging strategy of the energy storage device in real time, to ensure the stability and sustainability of power supply in the power grid.

9. The system for detecting grid-connected optimization of distributed photovoltaic power stations according to claim 2, wherein the operation and maintenance management module comprises:

a device monitoring subunit, configured to monitor working states of all devices in real time, to ensure normal operation of the devices;

a fault reporting and recording subunit, configured to record details of a fault event and track a handling process; and a report generation subunit, configured to generate reports related to system operation, a device fault, a maintenance record, and the like, for future reference and analysis.

10. The system for detecting grid-connected optimization of distributed photovoltaic power stations according to claim 7, wherein the grid-connected optimization algorithm subunit optimizes energy scheduling based on the generated power of the photovoltaic power station, the load demand, the state of the energy storage device, and the power grid load by using a particle swarm optimization algorithm, to maximize overall energy efficiency of the system and minimize power grid load fluctuations during grid connection.

* * * * *